(12) United States Patent
Shetty et al.

(10) Patent No.: US 9,942,158 B2
(45) Date of Patent: Apr. 10, 2018

(54) DATA TRAFFIC POLICY MANAGEMENT SYSTEM

(71) Applicant: Dell Products L.P., Round Rock, TX (US)

(72) Inventors: Sudhir Vittal Shetty, Cedar Park, TX (US); Gaurav Chawla, Austin, TX (US); Joseph L. White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 14/496,963

(22) Filed: Sep. 25, 2014

(65) Prior Publication Data

US 2016/0094461 A1   Mar. 31, 2016

(51) Int. Cl.
*G06F 15/16* (2006.01)
*H04L 12/813* (2013.01)
*H04L 12/935* (2013.01)
*H04L 12/931* (2013.01)
*H04L 12/715* (2013.01)

(52) U.S. Cl.
CPC .............. *H04L 47/20* (2013.01); *H04L 49/30* (2013.01); *H04L 49/70* (2013.01); *H04L 45/64* (2013.01); *Y02B 60/43* (2013.01)

(58) Field of Classification Search
CPC ......... H04L 45/38; H04L 45/42; H04L 47/20; H04L 47/125; H04L 45/64; H04L 49/30; H04L 49/70
USPC .................................................. 709/221–245
See application file for complete search history.

(56) References Cited

U.S. PATENT DOCUMENTS

| | | | | |
|---|---|---|---|---|
| 6,047,322 A * | 4/2000 | Vaid | ...................... | H04L 1/1854 370/449 |
| 6,721,273 B1 * | 4/2004 | Lyon | ..................... | H04L 49/255 370/235 |
| 7,657,628 B1 * | 2/2010 | McDysan | ........... | G06F 11/2028 370/401 |
| 2004/0017804 A1 * | 1/2004 | Vishnu | ................ | H04L 12/5601 370/386 |
| 2007/0204036 A1 * | 8/2007 | Mohaban | ................ | H04L 12/66 709/224 |
| 2008/0186875 A1 * | 8/2008 | Kitani | ................. | H04L 41/0816 370/254 |
| 2010/0095367 A1 * | 4/2010 | Narayanaswamy | | H04L 63/0245 726/12 |

(Continued)

*Primary Examiner* — David Lazaro
*Assistant Examiner* — Berhanu Shitayewoldetadik
(74) *Attorney, Agent, or Firm* — Haynes and Boone, LLP

(57) ABSTRACT

An information handling system (IHS) network includes a switch IHS that coupled together a plurality of server IHSs. A source software-defined (SD) virtual appliance is located on one of the plurality of server IHSs. A destination SD virtual appliance is located on one of the plurality of server IHSs. An SD network controller is located on at least one of the plurality of server IHSs. The SD network controller is configured to receive a data traffic flow identifier and policy information that is associated with at least one data traffic flow policy from the source SD virtual appliance. The SD network controller determines a plurality of ports located between the source SD virtual appliance and the destination SD virtual appliance using the data traffic flow identifier. The SD network controller then configures each of the plurality of ports using the at least one data traffic flow policy.

20 Claims, 6 Drawing Sheets

(56) References Cited

U.S. PATENT DOCUMENTS

| | | | |
|---|---|---|---|
| 2011/0093575 A1* | 4/2011 | Dube | G06F 15/16 |
| | | | 709/223 |
| 2012/0155256 A1* | 6/2012 | Pope | G06F 13/128 |
| | | | 370/230 |
| 2013/0311675 A1* | 11/2013 | Kancherla | H04L 43/026 |
| | | | 709/244 |
| 2015/0188949 A1* | 7/2015 | Mahaffey | H04L 63/20 |
| | | | 726/1 |

* cited by examiner

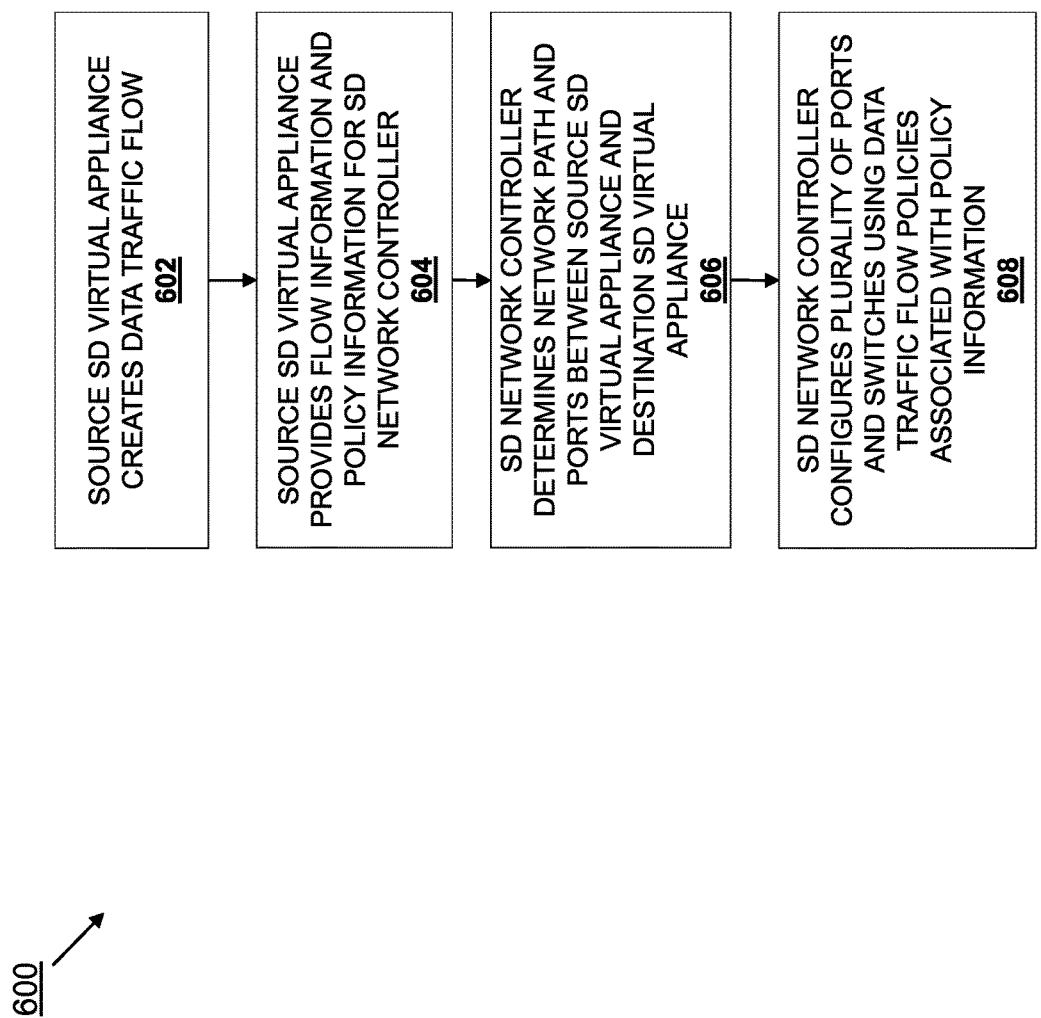

DATA TRAFFIC POLICY MANAGEMENT SYSTEM

BACKGROUND

The present disclosure relates generally to information handling systems, and more particularly to a data traffic policy management system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, physical server IHSs, are utilized in the provision of software-defined data centers by providing virtual switching systems, virtual storage systems, and/or other virtualized service elements running on the physical server IHSs. Such virtualized service elements are scale-out capable as they may be added, removed, expanded, shrunk, and/or otherwise be modified during run-time. Typically, such physical server IHSs are connected together through physical switch IHSs, which also connect those physical server IHSs to client IHSs. Data traffic transmitted between the client IHSs and the physical server IHSs and through the physical switch IHSs such as, for example, data traffic that includes requests from the client IHSs for data stored on the physical server IHSs or data provided by the physical server IHSs to the client IHSs, is typically referred to as North/South (N/S) data traffic. Data transmitted between the physical server IHSs and through the physical switch IHSs such as, for example, data traffic associated with the retrieval of data stored on the physical server IHSs for provision the client IHSs, data replication traffic, data traffic caching, data backup traffic, data rebuilding traffic, data rebalancing traffic, data traffic associated with failure recovery, etc., is typically referred to as East/West (E/W) data traffic. The transmission of E/W data traffic raises a number of issues.

Some E/W data traffic such as, for example, data traffic associated with the retrieval of data stored on the physical server IHSs for an I/O request from the client IHSs, may be relatively high priority E/W data traffic because it relates to serving the data I/O request initiated by a client IHS. To contrast, some E/W data traffic such as, for example, transient E/W data traffic such as data rebalancing traffic that occurs when a physical or virtual storage system is added to or removed from the system, may be relatively low priority because it is not related to serving the I/O request to a client IHS. However, conventional systems do not distinguish between different types of E/W data traffic due to the complications of managing policies with respect to transient E/W data traffic flows. As a result, all E/W data traffic is given the same priority such that relatively low priority E/W data rebalancing traffic may be transmitted before relatively high priority E/W data retrieval and provisioning traffic associated with a client IHS request. This can lead to delays in satisfying client IHS requests.

Accordingly, it would be desirable to provide a system for managing E/W data traffic policies.

SUMMARY

According to one embodiment, a data traffic policy management system includes a physical server IHS chassis; a network interface controller that is located in the physical server IHS chassis; a software-defined (SD) network controller that is located in the physical server IHS chassis and that is coupled to the network interface controller, wherein the SD network controller is configured to: receive, through the network interface controller from a source SD virtual appliance, a data traffic flow identifier and policy information that is associated with at least one data traffic flow policy; determine a plurality of ports located between the source SD virtual appliance and a destination SD virtual appliance using the data traffic flow identifier; and configure each of the plurality of ports using the at least one data traffic flow policy.

BRIEF DESCRIPTION OF THE DRAWINGS

FIG. 6 is a flow chart illustrating an embodiment of a method for managing data traffic policies.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
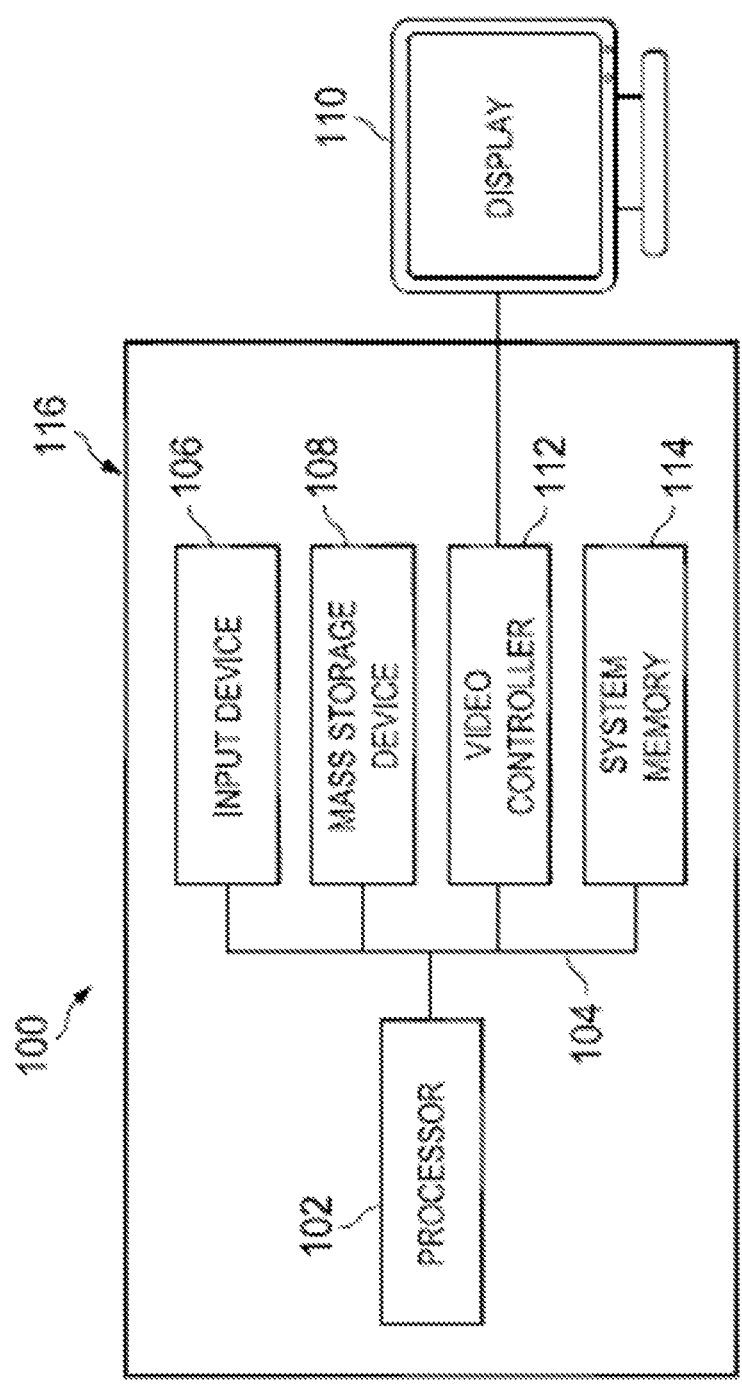
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
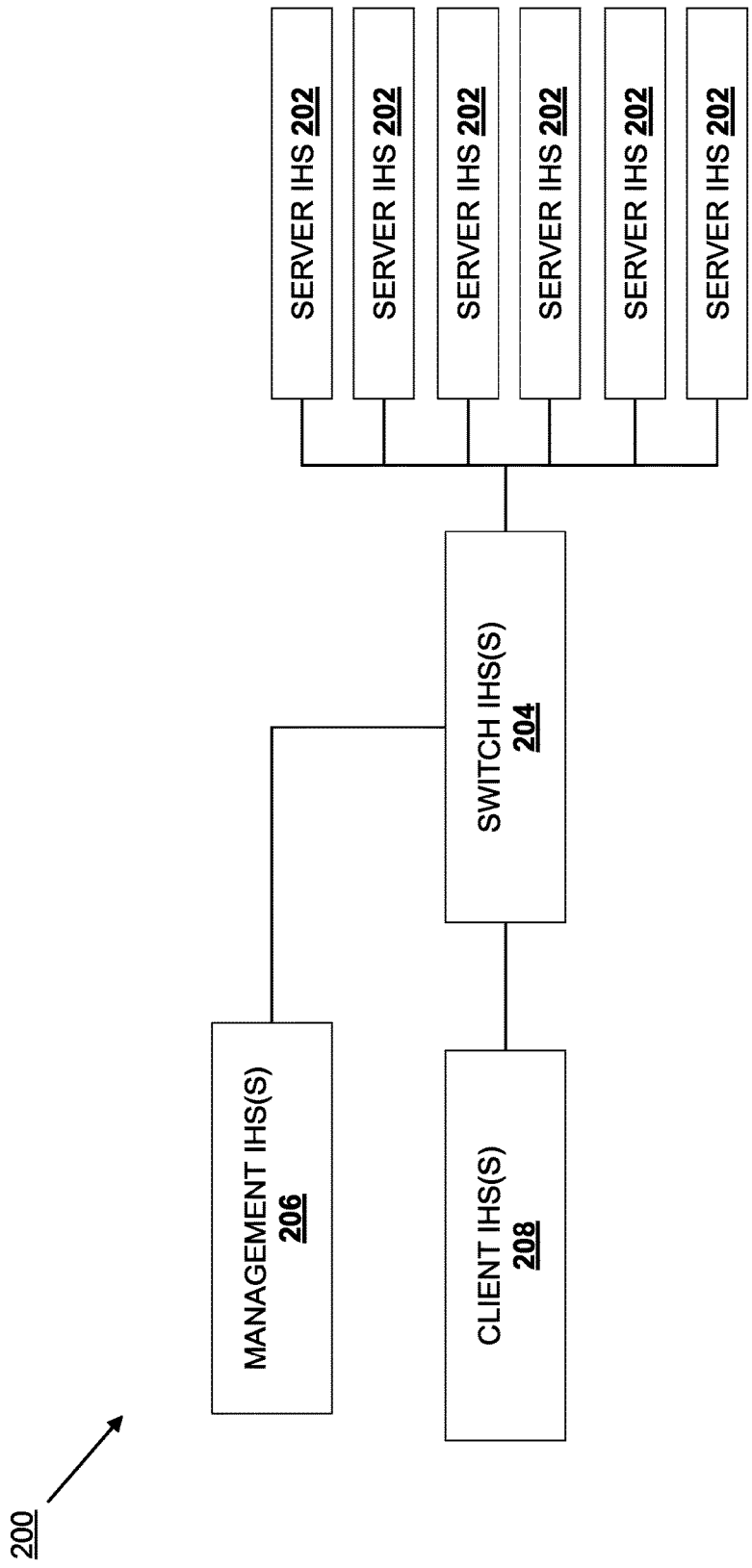
FIG. 2 is a schematic view illustrating an embodiment of a data traffic policy management system.

Referring now to FIG. 2, an embodiment of a data traffic policy management system 200 is illustrated. The data traffic policy management system 200 includes a plurality of server IHSs 202 that may each be, for example, the IHS 100 discussed above with reference to FIG. 1 and/or may include some or all of the components of the IHS 100. In an embodiment, the server IHSs 202 may be physical servers that are located in one or more racks in a data center, or Software Defined servers provided on a physical service. As discussed below, the server IHSs 202 may be used in providing a Software Defined Data Center (SDDC) with Software Defined Storage (SDS), Software Defined Networking (SDN), Software Defined (SD) virtual appliances, and/or a variety of other SD virtual services known in the art. One or more switch IHSs 204 are coupled to the server IHSs 202 and/or each other, as well as to one or more management IHSs 206 and one or more client IHSs 208. Any or all of the switch IHSs 204, the management IHSs 206, and/or the client IHSs 208 may be the IHS 100 discussed above with reference to FIG. 1 and/or may include some or all of the components of the IHS 100. In some embodiments, the switch IHSs 204 may be referred to as an access fabric and may include input/output aggregator (IOA) or "Blade" switch IHSs, Top of Rack (ToR) switch IHSs, aggregation switch IHSs, virtual switch IHSs (e.g., provided on a server IHS), and/or a variety of other switch IHSs known in the art. Each of the switch IHS(s) 204 may include one or more physical or virtual ports that may be coupled to ports on the server IHSs 202, other switch IHSs 204, management IHS(s) 206, and/or client IHS(s) 208.

In the discussion below, data traffic that is transmitted between the client IHSs 208 and the server IHSs 202 (i.e., through the switch IHSs 204) such as, for example, data traffic that includes requests from the client IHSs 208 for data stored on the server IHSs 202 and data provided by the server IHSs 202 to the client IHSs 208, is referred to as North/South (N/S) data traffic. Other examples of N/S data traffic may include application virtual machine (VM) data traffic, hypervisor data traffic, etc. However, N/S data traffic other than that enumerated above is known in the art and will fall within the scope of the present disclosure. Furthermore, data that transmitted between the server IHSs 202 and through the switch IHSs 204 such as, for example, data traffic associated with the retrieval of data stored on the server IHSs 202 for provision the client IHSs 208 (e.g., data traffic associated with determining which server IHSs 202 that different subsets of a set of requested data is stored), data replication traffic, data traffic caching, data backup traffic, data rebuilding traffic, data rebalancing traffic, data traffic associated with failure recovery, and metadata traffic, is referred to as East/West (E/W) data traffic. However, E/W data traffic other than that enumerated above is known in the art and will fall within the scope of the present disclosure. One of skill in the art will recognize that many E/W data traffic flows are transient and generated dynamically by the SD virtual appliances and SD services discussed below.

Figure 3:
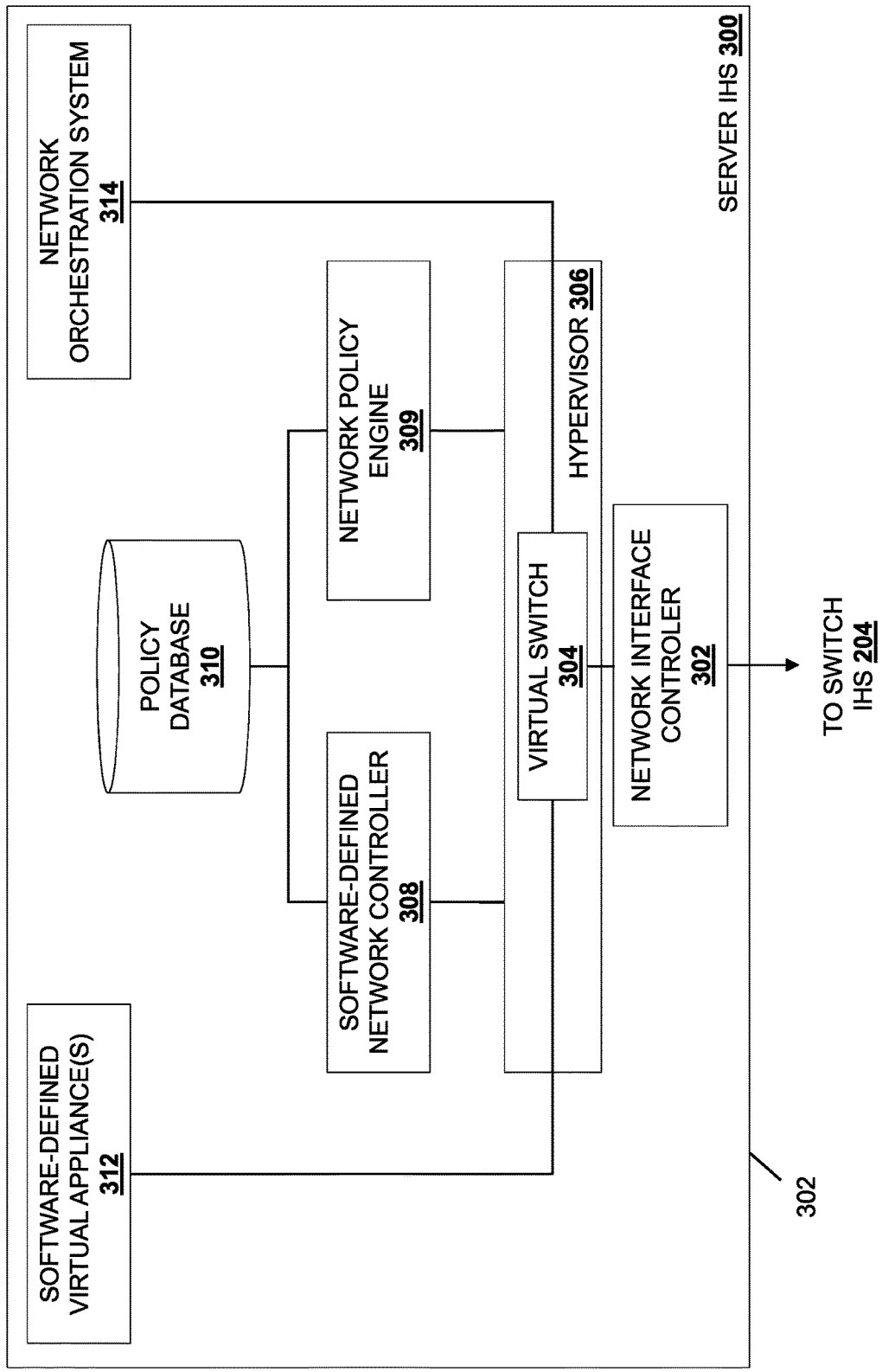
FIG. 3 is a schematic view illustrating an embodiment of a physical server IHS in the data traffic policy management system of FIG. 2.

Referring now to FIG. 3, an embodiment of a server IHS 300 is illustrated. The server IHS 300 may be one of the server IHSs 202 discussed above with reference to FIG. 2. As such, the server IHS 300 may be the IHS 100 discussed above with reference to FIG. 1 and/or may include some or all of the components of the IHS 100. As discussed in further detail below, the server IHS 300 includes components that operate to receive data traffic flow identifiers and policy information, determine a plurality of ports used in the transmission path for any of a plurality of data traffic flows, and configure the plurality of ports using the policy information for each of those data traffic flows. Such actions by the server IHS 300 allow for the prioritization of E/W data traffic flows relative to each other such that higher priority E/W data traffic flows (e.g., data traffic flows associated with serving client IHS requested data to requesting client IHSs) are prioritized over lower priority E/W data traffic flows, allows for different quality of service (QoS) policies to be applied to different E/W data traffic flows, and provides a number of other benefits that would be apparent to one of skill in the art in possession of the present disclosure.

The server IHS 300 includes a network interface controller (NIC) 302 such as, for example, a 10-gigabit Ethernet (10GE) NIC. While not illustrated, the server IHS 300 may include a variety of hardware other than the NIC 302. For example, the server IHS 300 may include a processing system (e.g., the processor 102 discussed above with reference to FIG. 1) and a memory system (e.g., the system memory 114 discussed above with reference to FIG. 1) that includes instructions that, when executed by the processing system, cause the processing system to provide the virtualization components, the SD components, and/or other subsystems and functionality provided by the server IHS 300 discussed below. Furthermore, the server IHS 300 may include a wide variety of conventional server IHS components known in the art while remaining within the scope of the present disclosure.

The NIC 302 may be communicatively coupled to one of the switch IHSs 204 discussed above with reference to FIG. 2, as well as to a virtual switch 304 provided by a hypervisor 306 in the server IHS 300. The virtual switch 304 is coupled to a Software Defined (SD) network controller 308 and a network policy engine that, in the illustrated embodiment, are each coupled to a policy database 310. While the SD network controller 308 is illustrated and described below as being located on a single server IHS 202/300, the SD network controller 308 may be distributed across multiple server IHSs 202 while remaining within the scope of the present disclosure. While the policy database 310 is illustrated as being located in the chassis of the server IHS 300, it may be located outside of the chassis of the server IHS 300 and coupled to the SD network controller 308 through a network while remaining within the scope of the present disclosure. In some embodiments, the network policy engine 309 may operate to receive and store policies in the policy database 310 that have been pre-defined by a user and that may then be used by the SD network controller 308 to configure ports in the data traffic policy management system 200. The virtual switch 304 may also be coupled to one or more Software Defined (SD) virtual appliance(S) 312 such as, for example, SD storage system(s). The virtual switch 304 may also be coupled to a network orchestration system 314. While an example of components of the server IHS 300 have been illustrated and described, other components (only some of which are discussed below) such as, for example, network switch application programming interfaces (APIs), application virtual machines, and/or a variety of other components known in the art may be included in the server IHS 300 while remaining within the scope of the present disclosure.

Figure 4:
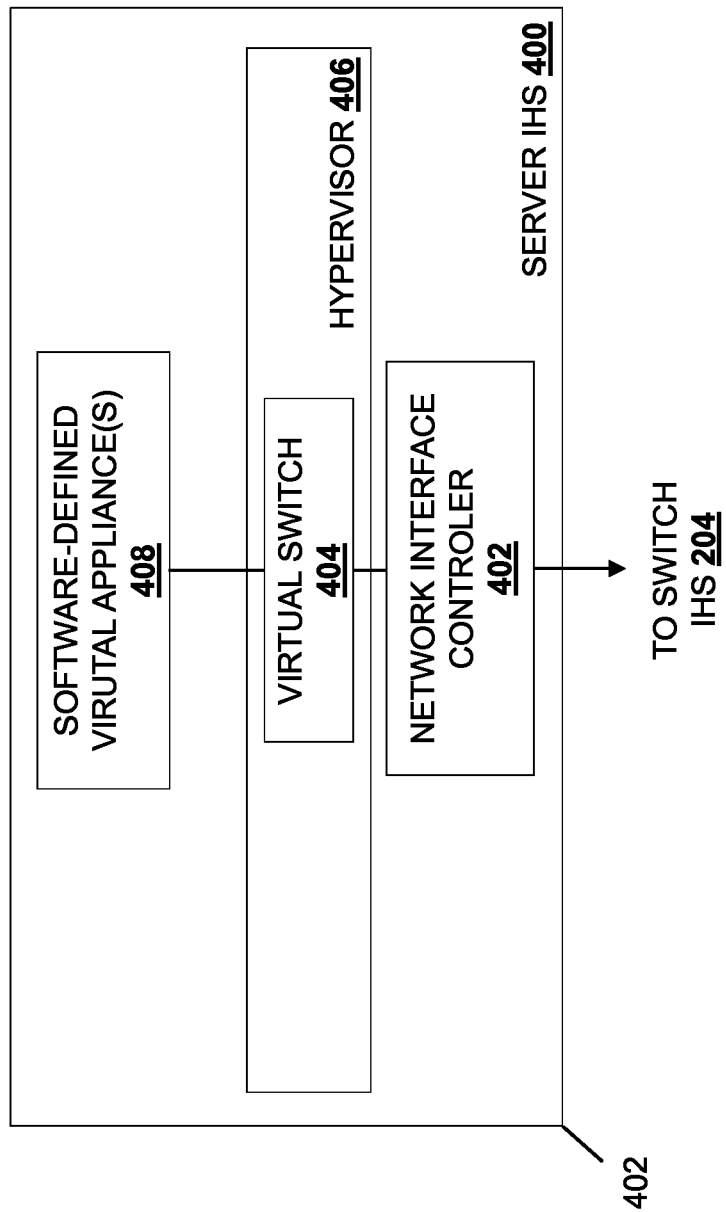
FIG. 4 is a schematic view illustrating an embodiment of a physical server IHS in the data traffic policy management system of FIG. 2.

Referring now to FIG. 4, an embodiment of a server IHS 400 is illustrated The server IHS 400 may be one of the server IHSs 202 discussed above with reference to FIG. 2. As such, the server IHS 400 may be the IHS 100 discussed above with reference to FIG. 1 and/or may include some or all of the components of the IHS 100. As discussed in further detail below, the embodiment of the server IHS 400 illustrated in FIG. 4 includes virtualization components (e.g., a hypervisor, a virtual switch, and an SD virtual appliance) that operate to provide data to client IHSs 208 via N/S data traffic flows, and transmit data with other server IHSs via E/W data traffic flows. The server IHS 400 includes a network interface controller (NIC) 402 such as, for example, a 10-gigabit Ethernet (10GE) NIC. While not illustrated, the server IHS 400 includes a variety of hardware other than the NIC 402. For example, the server IHS 400 may include a processing system (e.g., the processor 102 discussed above with reference to FIG. 1) and a memory system (e.g., the system memory 114 discussed above with reference to FIG. 1) that includes instructions that, when executed by the processing system, cause the processing system to provide the virtualization components, the SD components, and/or other subsystems and functionality of the server IHS 400 discussed below. Furthermore, the server IHS 300 may include a wide variety of conventional server IHS components known in the art while remaining within the scope of the present disclosure. The NIC 402 is communicatively coupled to one of the switch IHSs 204 discussed above with reference to FIG. 2, as well as to a virtual switch 404 provided by a hypervisor 406 in the server IHS 400. The virtual switch 404 is coupled to one or more Software Defined (SD) virtual appliance(s) 408 such as, for example, SD storage system(s). While an example of components of the server IHS 400 have been illustrated and described, other components may be included in the server IHS 400 while remaining within the scope of the present disclosure.

Figure 5:
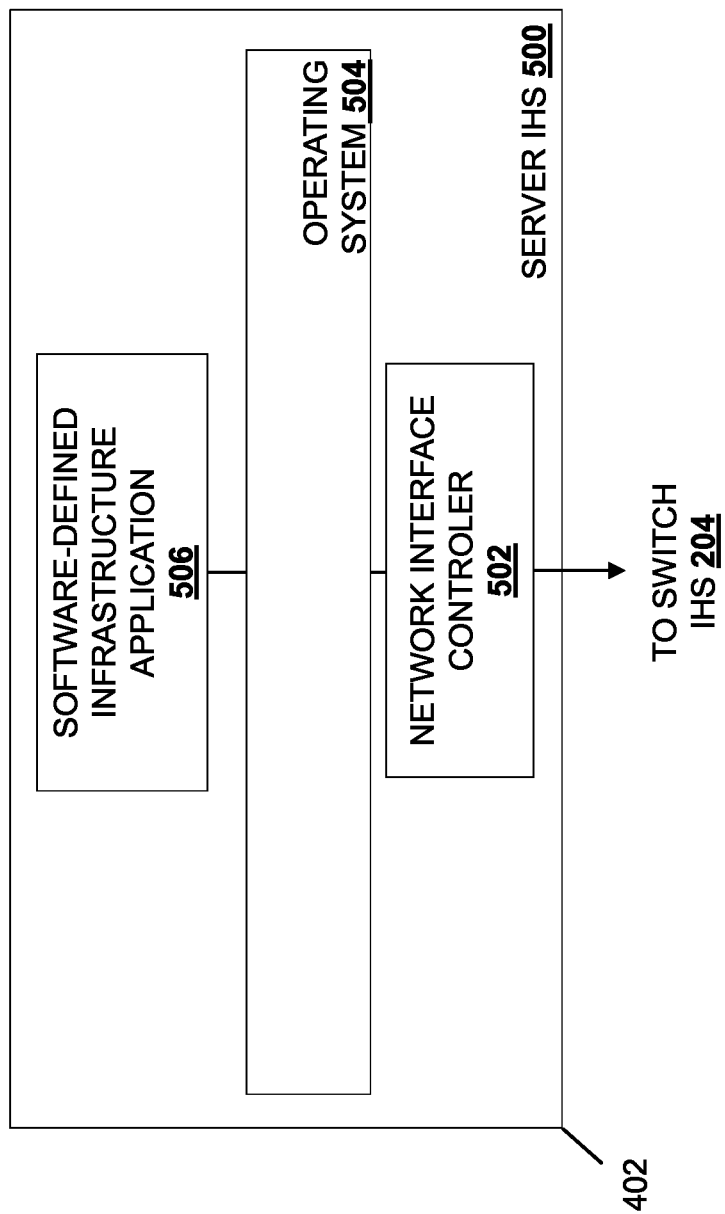
FIG. 5 is a schematic view illustrating an embodiment of a physical server IHS in the data traffic policy management system of FIG. 2.

Referring now to FIG. 5, an embodiment of a server IHS 500 is illustrated. The server IHS 500 may be one of the server IHSs 202 discussed above with reference to FIG. 2. As such, the server IHS 500 may be the IHS 100 discussed above with reference to FIG. 1 and/or may include some or all of the components of the IHS 100. As discussed in further detail below, the embodiment of the server IHS 500 illustrated in FIG. 5 includes an operating system and software (e.g., an SD infrastructure application) that operate to provide data to client IHSs 208 via N/S data traffic flows, and transmit data with other server IHSs via E/W data traffic flows. The server IHS 500 includes a network interface controller (NIC) 502 such as, for example, a 10-gigabit Ethernet (10GE) NIC. While not illustrated, the server IHS 500 includes a variety of hardware other than the NIC 502. For example, the server IHS 500 may include a processing system (e.g., the processor 102 discussed above with reference to FIG. 1) and a memory system (e.g., the system memory 114 discussed above with reference to FIG. 1) that includes instructions that, when executed by the processing system, cause the processing system to provide the operating system, the SD infrastructure application, and/or other subsystems and functionality of the server IHS 500 discussed below. Furthermore, the server IHS 500 may include a wide variety of conventional server IHS components known in the art while remaining within the scope of the present disclosure. The NIC 502 is communicatively coupled to one of the switch IHSs 204 discussed above with reference to FIG. 2, as well as to an operating system 504. The operating system 504 provides for the execution of the Software Defined (SD) virtual appliance software 506 to provide one or more Software Defined (SD) virtual appliance(s) such as, for example, SD storage system(s). While an example of components of the server IHS 500 have been illustrated and described, other components may be included in the server IHS 500 while remaining within the scope of the present disclosure.

Referring now to FIG. 6, an embodiment of a method 600 for managing data traffic policies is illustrated. In an embodiment, the method 600 involves the data traffic policy management system 200 including the server IHS 300 as one of the server IHSs 202, and any combination of the servers 400 and/or 500 (or server IHSs with similar functionality) as the other server IHSs 202. However, as discussed above, the server IHS 300 may be replaced by a plurality of server IHSs that operate to provide the SD network controller. The method 600 begins at block 602 where a source SD virtual appliance creates a data traffic flow. For example, any of the SD virtual appliances discussed above may be the source SD virtual appliance that creates a data traffic flow at block 602 in response to, for example, a request for data stored on the SD virtual appliance, a scheduled or unscheduled data action (e.g., a data replication action, a data caching action, a data backup action, a data rebalancing action, a failure recovery action, etc.), a metadata management action, and/or a variety of other data traffic flow creation situations known in the art. In an embodiment, the data traffic flow created at block 602 may include an E/W data traffic flow such as, for example, an E/W data traffic flow associated with the retrieval of data stored on the physical server IHSs for provision the physical client IHSs (e.g., data associated with determining where subsets of a set of requested data are stored on different server IHSs 202), an E/W data traffic flow including data replication traffic, an E/W data traffic flow for providing data traffic caching, an E/W data traffic flow including data backup traffic, an E/W data traffic flow including data rebuilding traffic, an E/W data traffic flow including data rebalancing traffic, an E/W data traffic flow including data traffic associated with failure recovery, E/W data traffic for changes, coordination, and/or management of SD metadata, and/or a variety of other E/W data traffic known in the art.

The method 600 may then proceed to block 604 where, in response to creating the data traffic flow, the source SD virtual appliance provides policy information to the SD network controller. In an embodiment of block 604, the source SD virtual appliance that created the data traffic flow at block 602 may provide policy information for the SD network controller 308 by sending a Link Layer Discovery Protocol (LLDP) frame to the access fabric (i.e., one or more of the switch IHS(s) 204) that is directed to the SD network controller 308 (e.g., via an identifier for the SD network controller 308) and that may include one or more policy identifiers, an E/W data traffic flow identifier, and an identifier of the source SD virtual appliance. In some embodiments, the one or more policy identifiers may be associated with policies and/or policy profiles in the policy database 310 such as, for example, a priority flow control policy (e.g., whether priority flow control is enabled or disabled), a minimum bandwidth policy, a maximum bandwidth policy, a QoS policy, and/or other data traffic flow policies known in the art. In some embodiments, the E/W data traffic flow identifier may include a media access control (MAC) address, an Internet Protocol (IP) address, a transport control protocol (TCP) socket address, and/or a variety of other data traffic flow identifiers known in the art. In some embodiments, the SD virtual appliances (e.g., the SD virtual appliances 312, 408, and 506) are configured to provide one or more SD services, with each SD service associated with an SD service identifier that is unique for that SD service relative to SD service identifiers associated with other SD services, and that SD service identifier may be used as or included in the identifier of the source SD virtual appliance. Thus, the identifier for the source SD virtual appliance may be provided by an SD service running on the source SD virtual appliance, or by the source SD virtual appliance itself.

In another embodiment of block 604, the source SD virtual appliance that created the data traffic flow at block 602 may provide the policy information for the SD network controller 308 by sending the LLDP frame to the access fabric that is directed to the SD network controller 308 (e.g., via an identifier for the SD network controller 308) and that includes one or more policies to be implemented by the SD network controller 308, the E/W data traffic flow identifier discussed above, and the identifier of the source SD virtual appliance discussed above. In those embodiments, the one or more policies may include, for example, a priority flow control policy (e.g., whether priority flow control is enabled or disabled), a minimum bandwidth policy, a maximum bandwidth policy, and/or other qualify of server (QoS) policies known in the art.

In another embodiment of block 604, the source SD virtual appliance that created the data traffic flow at block 602 may provide the policy information for the SD network controller 308 by sending a frame that is directed to the SD network controller 308 (e.g., via an IP address for the server IHS 300 (or server IHSs) that include the SD network controller 308), where the frame includes the one or more policy identifiers/policies to be implemented by the SD network controller 308 discussed above, the E/W data traffic flow identifier discussed above, and the identifier of the source SD virtual appliance discussed above. In an embodiment, the sending of the policy information directly to the SD network controller 308 may be facilitated using application programming interfaces (APIs) associated with (e.g., exposed by) the SD network controller 308. Any of the policy information provided according to the embodiments discussed above may include or be associated with data traffic flow policies that have been configured by a user (e.g., a network administrator) and stored in the policy database 310, may include data traffic flow policies transmitted by the source SD virtual appliance at block 604, may include pre-defined policies imported from an external repository, etc. In addition, policies other than those explicitly discussed above may be added to the system based on the capabilities supported by the switch IHSs that include the ports between the source SD virtual appliance and the destination SD virtual appliance.

In response to receiving the LLDP frame that identifies the SD network controller 308 (e.g. via the identifier for the SD network controller 308 in the LLDP frame) and that includes the one or more policy identifiers/policies to be implemented by the SD network controller 308, the E/W data traffic flow identifier, and the identifier for the source SD virtual appliance, the access fabric may forward that LLDP frame to the server IHS 300 (e.g., using the identifier for the SD network controller 308). In response to receiving the frame that identifies the SD network controller 308 (e.g., via the IP address of the server IHS 300) and that includes the one or more policy identifiers/policies to be implemented by the SD network controller 308, the E/W data traffic flow identifier, and the identifier of source SD virtual appliance, the access fabric may forward that frame to the server IHS 300 (e.g., using the IP address of the server IHS 300). The virtual switch 304 may receive the LLDP frame or the frame including the IP address of the server 300 through the NIC 302 and provide it to the SD network controller 308.

The method 600 then proceeds to block 606 where the SD network controller determines network ports and/or an end-to-end bidirectional path between the source SD virtual appliance and the destination SD virtual appliance. In an embodiment, the SD network controller 308 may use the identifier for the source SD virtual appliance and the E/W data traffic flow identifier received at block 604 to determine a path that include the plurality of switch IHSs 204 and network ports that exist between the source SD virtual appliance and a destination SD virtual appliance to which the E/W data traffic flow is directed. In different embodiments, any of the plurality of ports in the path determined at block 606 may be physical ports (e.g., on physical switch IHSs) or virtual ports (e.g., on virtual switches). For example, the SD network controller 308 may have access to a network topology map and/or other mapping of the data traffic policy management system 200 that allows the SD network controller 308 to use the identifier for the source SD virtual appliance and the E/W data traffic flow identifier to identify physical and/or virtual ports in the path between the SD virtual appliance that created the E/W data traffic flow and the SD virtual appliance to which the E/W data traffic flow is directed.

The method 600 then proceeds to block 608 where the SD network controller configures the plurality of switch IHSs 204 and network ports using at least one data traffic flow policy associated with the policy information. In some embodiments, the SD network controller 308 may use the one or more policy identifiers received at block 604 to retrieve one or more data traffic flow policies or policy profiles from the policy database 310. In other embodiments, the SD network controller 308 may retrieve one or more data traffic flow policies or policy profiles directly from the policy information (i.e., included directly in an LLDP frame as discussed above) received at block 604. In embodiments where one or more data traffic flow policies are retrieved directly from the policy information received at block 604, the SD network controller 308 may validate the one or more data traffic flow policies by ensuring that all the switch IHSs 204 along the path support the requested policies and there are enough network resources (e.g., memory buffers, available bandwidth, etc.) to enforce the requested policies. The SD network controller 308 configure each of the plurality of ports determined at block 606 to be located in the path between the source SD virtual appliance and the destination SD virtual appliance using the one or more retrieved data traffic flow policies. In an embodiment, the configuration of the plurality of switch IHSs 204 and ports at block 608 may include the SD network controller 308 sending the one or more data traffic flow policies to each of the physical switch IHSs that provide physical ports determined to be in the path between the source SD virtual appliance and the destination SD virtual appliance, and/or to each of the virtual switch IHSs that provide virtual ports determined to be in the path between the source SD virtual appliance and the destination SD virtual appliance. In response to receiving the one or more data traffic flow policies, the physical switch IHSs and/or virtual switch IHSs may use techniques known in the art to configure their respective ports of the plurality of ports determined to be in the path between the source SD virtual appliance and the destination SD virtual appliance using the one or more data traffic flow policies.

Thus, the systems and methods described herein allow the paths associated with each of a plurality of E/W data traffic flows to be dynamically configured in the manner discussed above according to the method 600 without requiring intervention by a user or network administrator, which allows the E/W data traffic flows in the data traffic policy management system 200 to be prioritized relative to each other and be subject to different QoS policies as they are transmitted between the source SD virtual appliances and destination SD virtual appliances and through the ports on the physical switch IHSs and/or virtual switch IHSs. As such, relatively low priority E/W data traffic flows (e.g., data rebalancing traffic) may be prioritized below relatively high priority E/W data traffic (e.g., data traffic associated with the retrieval and provisioning of data associated with a client IHS request), while in some cases having different QoS policies applied, such that the higher priority E/W data traffic is transmitted before the low priority E/W data traffic and desires QoS's. In some embodiments, a source SD virtual appliance (or SD server running on the source SD virtual appliance) may request the addition or removal of policies on ports as E/W data traffic flows are added and removed from the system. For example, if a data rebalancing needs to take place due to an SDS or server IHS 202 being added or removed from the data traffic policy management system 200, the source SD virtual appliance (or SD service running on the source SD virtual appliance) may provide policy information for the configuration of ports in a path for a newly created E/W data traffic flow prior to beginning the data rebalancing operations, and then request the deletion of that configuration from those ports after the completion of the data rebalancing operations.

In an embodiment, information transmitted during the method 600 may be provided to the management IHS(s) 206 to allow a network administrator to monitor the network by tracking the creation of data traffic flows, the configuration of ports, and/or other actions performed during the method 600. The sharing of information with the management IHS(s) 206 allows a network administrator to determine which SD virtual appliances and/or SD services are responsible for configured ports for any data traffic flow in the system. Furthermore, the management IHS(s) 206 may control which SD virtual appliances and/or SD services are allowed to alter configurations (e.g., of switch IHSs or ports) in the data traffic policy management system 200 by providing the SD network controller authorization identifiers for the SD virtual appliances and/or SD services that are authorized to configure ports in the data traffic policy management system 200. As such, at block 604, the SD network controller may check the identifier received from the source SD virtual appliance or SD service against the authorized identifiers to determine whether to configure the ports at block 608.

In other embodiments, the SD network controller 308 may be provided on a network control plane in an IHS that includes components such as the network orchestration system 314 discussed above, the network policy engine discussed above, and/or other control plane components known in the art. That network control plane may include policy profiles stored in a database, representational state transfer (REST) APIs for policies that define the mappings of data traffic flows to policy profiles, and may leverage the OpenStack Neutron Group Policy Model to define standards based API's for policy control. The management IHS(s) 206 may then interact with the network policy engine in the network control plane to define profiles and configure the system, with the network policy engine managing the policy profiles received from the management IHS(s) 206. As such, high priority QoS profiles, medium priority QoS profiles, low priority QoS profiles, and default QoS profiles may be created, stored, managed, and used to configure the system as discussed above. The mappings of the data traffic flows to policy profiles may then be configured on demand, allowing for static configurations at setup or start time, and dynamic configuration for transient E/W data traffic flows that are created dynamically in the system as needed. This further allows for the provisioning of time based policies. For example, a data traffic flow may be associated with one or more first policies that are used to configure the ports in its path, but when that data traffic flow exists for more than 20 seconds, one or more second policies may be used to reconfigure those ports in its path. The network orchestration system 314 may operate to manage the overall network topology, configure the switches and ports in the path of the data traffic flows, and monitor the system for policy enforcement and anomaly detection.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data traffic policy management system, comprising:
a first physical server information handling system (IHS) including:
a network interface controller; and
a software-defined (SD) network controller that is coupled to the network interface controller, wherein the SD network controller is configured to:
receive, through the network interface controller from a source SD virtual appliance that is provided on a second physical server IHS that is coupled to the first physical server IHS:
a data traffic flow identifier that identifies a first server-to-server data traffic flow that is a first type of server-to-server data traffic flow, that was created by the source SD virtual appliance, and that is destined for a destination SD virtual appliance on a third physical server IHS that is coupled to the first physical server IHS; and
policy information that is associated with at least one data traffic flow policy for the first server-to-server data traffic flow, wherein the at least one data traffic flow policy provides a first priority to the first server-to-server data traffic flow between the source SD virtual appliance and the destination SD virtual appliance that is based on the first server-to-server data traffic flow being the first type of server-to-server data traffic flow;

determine a plurality of ports located between the source SD virtual appliance and the destination SD virtual appliance using the data traffic flow identifier; and configure each of the plurality of ports with a first configuration using the at least one data traffic flow policy, wherein each of the plurality of ports is provided with the first configuration prior to the configuration of each of the plurality of ports with a second configuration for a second server-to-server data traffic flow that is a second type of server-to-server data traffic flow that is different than the first type of server-to-server data traffic flow, that is associated with at least one data traffic flow policy that provides a second priority that is different than the first priority, that is created by at least one SD virtual appliance provided on at least one physical server IHS that is coupled to the first physical server IHS, and that is destined for at least one SD virtual appliance provided on at least one physical server IHS that is coupled to the first physical server IHS, wherein the second priority is based on the second server-to-server data traffic flow being the second type of server-to-server data traffic flow.

2. The system of claim 1, wherein the policy information includes at least one policy identifier that is received from the source SD virtual appliance and that is associated with the at least one data traffic flow policy in a database that is accessible by the SD network controller, and wherein the SD network controller is configured to:

retrieve the at least one data traffic flow policy from the database using the at least one policy identifier.

3. The system of claim 1, wherein the policy information includes the at least one data traffic flow policy that is received from the source SD virtual appliance.

4. The system of claim 1, wherein the data traffic flow identifier and the policy information are included in Link Layer Discovery Protocol (LLDP) information that is received from the source SD virtual appliance and that identifies the SD network controller.

5. The system of claim 1, wherein the data traffic flow identifier and the policy information are included in a data packet with an Internet Protocol (IP) address that is received from the source SD virtual appliance and that is associated with the SD network controller.

6. The system of claim 1, wherein plurality of ports include at least one virtual port.

7. An information handling system (IHS) network, comprising:

a physical switch IHS;

a plurality of physical server IHSs coupled to the physical switch IHS;

a source software-defined (SD) virtual appliance that is provided on a first physical server IHS of the plurality of physical server IHSs;

a destination SD virtual appliance that is provided on a second physical server IHS of the plurality of physical server IHSs; and an SD network controller that is provided on at least one of the plurality of physical server IHSs, wherein the SD network controller is configured to:

receive, from the source SD virtual appliance:

a data traffic flow identifier that identifies a first server-to-server data traffic flow that is a first type of server-to-server data traffic flow, that was created by the source SD virtual appliance, and that is destined for the destination SD virtual appliance; and policy information that is associated with at least one data traffic flow policy for the first server-to-server data traffic flow, wherein the at least one data traffic flow policy provides a first priority to the first server-to-server data traffic flow between the source SD virtual appliance and the destination SD virtual appliance that is based on the first server-to-server data traffic flow being the first type of server-to-server data traffic flow;

determine a plurality of ports located between the source SD virtual appliance and the destination SD virtual appliance using the data traffic flow identifier; and configure each of the plurality of ports with a first configuration using the at least one data traffic flow policy, wherein each of the plurality of ports is provided with the first configuration prior to the configuration of each of the plurality of ports with a second configuration for a second server-to-server data traffic flow that is a second type of server-to-server data traffic flow that is different than the first type of server-to-server data traffic flow, that is associated with at least one data traffic flow policy that provides a second priority that is different than the first priority, that is created by at least one SD virtual appliance provided on at least one physical server IHS that is coupled to the first physical server IHS, and that is destined for at least one SD virtual appliance, wherein the second priority is based on the second server-to-server data traffic flow being the second type of server-to-server data traffic flow.

8. The IHS network of claim 7, wherein the policy information includes at least one policy identifier that is provided by the source SD virtual appliance and that is associated with the at least one data traffic flow policy in a database that is accessible by the SD network controller, and wherein the SD network controller is configured to:

retrieve the at least one data traffic flow policy from the database using the at least one policy identifier.

9. The IHS network of claim 7, wherein the policy information includes the at least one data traffic flow policy that is provided by the source SD virtual appliance.

10. The IHS network of claim 7, wherein the data traffic flow identifier and the policy information are provided by the source SD virtual appliance and included in Link Layer Discovery Protocol (LLDP) information that identifies the SD network controller.

11. The IHS network of claim 7, wherein the data traffic flow identifier and the policy information are provided by the source SD virtual appliance in a data packet with an Internet Protocol (IP) address that is associated with the SD network controller.

12. The IHS network of claim 7, wherein the plurality of ports include at least one virtual port.

13. The IHS network of claim 7, wherein the at least one data traffic flow policy includes a quality of service policy.

14. A method for managing data traffic policies, comprising:
   receiving, by a software-defined (SD) network controller that is provided on a first physical server information handling system (IHS) from a source SD virtual appliance that is provided on a second physical server IHS:
      a data traffic flow identifier that identifies a first server-to-server data traffic flow that is a first type of server-to-server data traffic flow, that was created by the source SD virtual appliance, and that is destined for a destination SD virtual appliance that is provided on a third physical server IHS; and
      policy information that is associated with at least one data traffic flow policy for the first server-to-server data traffic flow, wherein the at least one data traffic flow policy provides a first priority to the first server-to-server data traffic flow between the source SD virtual appliance and the destination SD virtual appliance that is based on the first server-to-server data traffic flow being the first type of server-to-server data traffic flow;
   determining, by the SD network controller, a plurality of ports located between the source SD virtual appliance and a destination SD virtual appliance using the data traffic flow identifier; and
   configuring, by the SD network controller, each of the plurality of ports with a first configuration using the at least one data traffic flow policy, wherein each of the plurality of ports is provided with the first configuration prior to the configuration of each of the plurality of ports with a second configuration for a second server-to-server data traffic flow that is a second type of server-to-server data traffic flow that is different than the first type of server-to-server data traffic flow, that is associated with at least one data traffic flow policy that provides a second priority that is different than the first priority, that is created by at least one SD virtual appliance provided on at least one physical server IHS that is coupled to the first physical server IHS, and that is destined for at least one SD virtual appliance, wherein the second priority is based on the second server-to-server data traffic flow being the second type of server-to-server data traffic flow.

15. The method of claim 14, wherein the policy information includes at least one policy identifier that is provided by the source SD virtual appliance and that is associated with the at least one data traffic flow policy in a database that is accessible by the SD network controller, and wherein the method further comprises:
   retrieving the at least one data traffic flow policy from the database using the at least one policy identifier.

16. The method of claim 14, wherein the policy information includes the at least one data traffic flow policy that is provided by the source SD virtual appliance.

17. The method of claim 14, wherein the data traffic flow identifier and the policy information are provided by the source SD virtual appliance and included in Link Layer Discovery Protocol (LLDP) information that identifies the SD network controller.

18. The method of claim 14, wherein the data traffic flow identifier and the policy information are provided by the source SD virtual appliance in a data packet with an Internet Protocol (IP) address that is associated with the SD network controller.

19. The method of claim 14, wherein the plurality of ports include at least one virtual port.

20. The method of claim 14, wherein the at least one data traffic flow policy includes a quality of service policy.

* * * * *